United States Patent
Langenfeld et al.

(10) Patent No.: US 10,227,832 B2
(45) Date of Patent: *Mar. 12, 2019

(54) TAPERED THREAD CONFIGURATION WITH IMPROVED DURABILITY

(71) Applicant: Vermeer Manufacturing Company, Pella, IA (US)

(72) Inventors: Michael D. Langenfeld, Pella, IA (US); Randy R. Runquist, Knoxville, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,571

(22) Filed: Mar. 14, 2017

(65) Prior Publication Data

US 2017/0314337 A1    Nov. 2, 2017

Related U.S. Application Data

(63) Continuation of application No. 14/663,208, filed on Mar. 19, 2015, now Pat. No. 9,605,491, which is a
(Continued)

(51) Int. Cl.
*E21B 17/042* (2006.01)
*E21B 17/03* (2006.01)
*F16L 15/08* (2006.01)

(52) U.S. Cl.
CPC ............ *E21B 17/042* (2013.01); *E21B 17/03* (2013.01); *F16L 15/08* (2013.01); *F16L 2201/40* (2013.01); *Y10T 403/56* (2015.01); *Y10T 403/68* (2015.01)

(58) Field of Classification Search
CPC ........ E21B 17/042; E21B 17/02; E21B 17/03; E21B 17/0426; F16B 33/02; F16B 33/00;
(Continued)

(56) References Cited

U.S. PATENT DOCUMENTS 603,004 A    4/1898  Booth
3,822,902 A  7/1974  Maurer et al.
(Continued)

FOREIGN PATENT DOCUMENTS

WO    WO 2008/057145 A2    5/2008

OTHER PUBLICATIONS

International Search Report and Written Opinion dated Jul. 27, 2012.
(Continued)

*Primary Examiner* — Yong-Suk Ro
(74) *Attorney, Agent, or Firm* — Merchant & Gould P.C.

(57) ABSTRACT

Underground drilling operation often requires connecting a drill tool (e.g., drill bit, backreamer, etc.) to a drill string. It is desirable to connect the drill tools to a drill string in a manner that facilitates quick and easy assembly and disassembly. Low torque coupling, commonly referred to as "torque-less" connection, can provide such functionality. The useful life and strength of such connections can be improved upon. The present disclosure provides a low torque coupling with improved strength and durability.

21 Claims, 9 Drawing Sheets

Related U.S. Application Data continuation of application No. 13/380,168, filed as application No. PCT/US2011/062356 on Nov. 29, 2011, now Pat. No. 8,991,490.

(60) Provisional application No. 61/435,689, filed on Jan. 24, 2011, provisional application No. 61/418,783, filed on Dec. 1, 2010.

(58) Field of Classification Search
CPC . F16L 15/06; F16L 15/00; F16L 15/08; F16L 2201/40; Y10T 403/56; Y10T 403/68
See application file for complete search history.

(56) References Cited

U.S. PATENT DOCUMENTS

| | | |
|---|---|---|
| 3,869,150 A | 3/1975 | Brown |
| 4,658,915 A | 4/1987 | Goris et al. |
| 4,892,337 A | 1/1990 | Gunderson et al. |
| 5,474,334 A * | 12/1995 | Eppink .............. E21B 7/067 175/74 |
| 5,505,502 A | 4/1996 | Smith et al. |
| 5,681,059 A | 10/1997 | Mackie |
| 6,254,146 B1 | 7/2001 | Church |
| 6,406,070 B1 | 6/2002 | DeLange et al. |
| 6,478,344 B2 | 11/2002 | Pallini, Jr. et al. |
| 6,860,514 B2 | 3/2005 | Wentworth et al. |
| 7,661,727 B2 | 2/2010 | Roussie et al. |
| 8,225,885 B2 | 7/2012 | Wentworth et al. |
| 8,991,490 B2 * | 3/2015 | Langenfeld .......... E21B 17/03 166/242.6 |
| 9,605,491 B2 * | 3/2017 | Langenfeld .......... E21B 17/03 |
| 2003/0155769 A1 | 8/2003 | Haines |
| 2005/0189147 A1 | 9/2005 | Williamson et al. |
| 2005/0224259 A1 | 10/2005 | Bise et al. |
| 2006/0078372 A1 | 4/2006 | Kanflod et al. |
| 2006/0214421 A1 * | 9/2006 | Muradov ............. E21B 17/042 285/333 |
| 2007/0074868 A1 | 4/2007 | Slack et al. |
| 2008/0099242 A1 | 5/2008 | Tjader |
| 2010/0012379 A1 | 1/2010 | Wentworth et al. |
| 2010/0014928 A1 | 1/2010 | Kakai et al. |
| 2010/0171305 A1 | 7/2010 | Roussie et al. |
| 2010/0308577 A1 | 12/2010 | Chin |

OTHER PUBLICATIONS

Railhead Underground Products, LLC, Railhead Quick Connect Features, 2 pages, website printout (2006).
Ballantine, Inc. HDD Downhole Tool & Accessories copyright date of 2006; 56 pages.
Third Party Oct. 30, 2014 cover letter enclosing David Helgeson's Oct. 21, 2014 declaration with exhibits and Claim Chart; 2 pages.
Third Party Claim Chart with annotated figures: enclosure from Third Party Oct. 30, 2014 letter; 11 pages.
Helgeson, David; Declaration dated Oct. 21, 2014; 85 pages.
The Railhead Catalog; undated; 74 pages. referenced as Exhibit A in David Helgeson's Oct. 21, 2014 Declaration wherein he alleges that the document was publicly available on or before Jan. 1, 2004.
Description of the Railhead Quick Connect System; web.archive. org; 2002; 2 pages: referenced as Exhibit B to David Helgeson's Oct. 21, 2014 Declaration wherein he alleges that the document was publicly available before August of 2002.
Description of the Railhead Quick Connect System; undated; 7 pages: referenced as Exhibit C to David Helgeson's Oct. 21, 2014 Declaration wherein he alleges that the document was publicly available before Aug. of 2002.
Vermeer D16X20 Navigator Operator's Manual copyright date of 1996; 120 pages.
Page 35-10 excerpted from Vermeer D16X20 Navigator Operator's Manual copyright date of 1996; 3 pages.
European Supplementary Search Report for European Application No. 11844366, completed Nov. 13, 2017 (10 pgs).

* cited by examiner

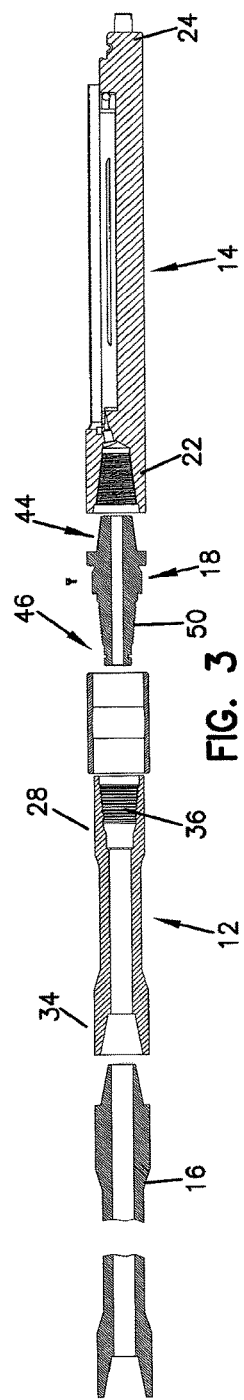
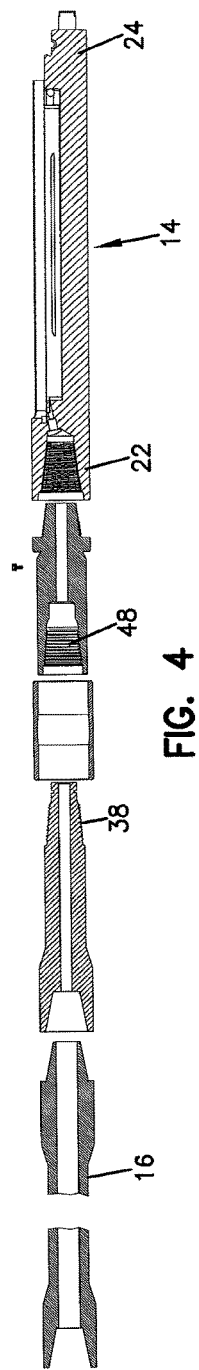
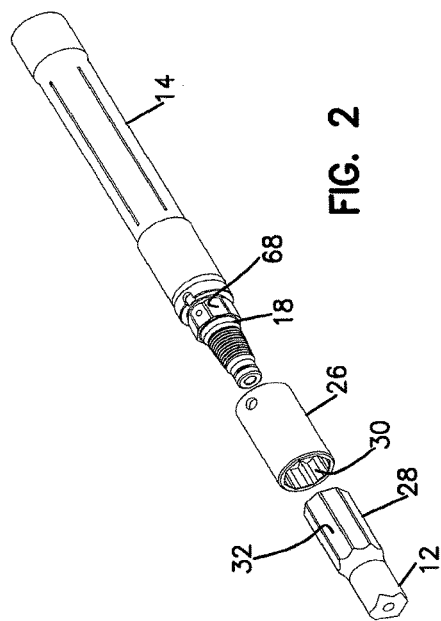

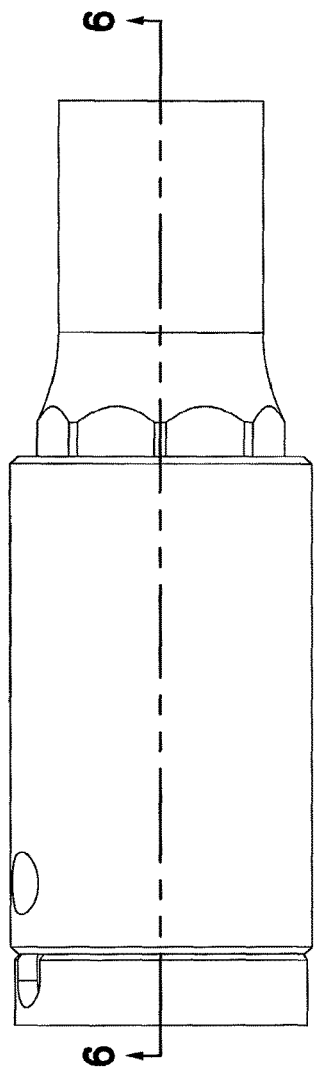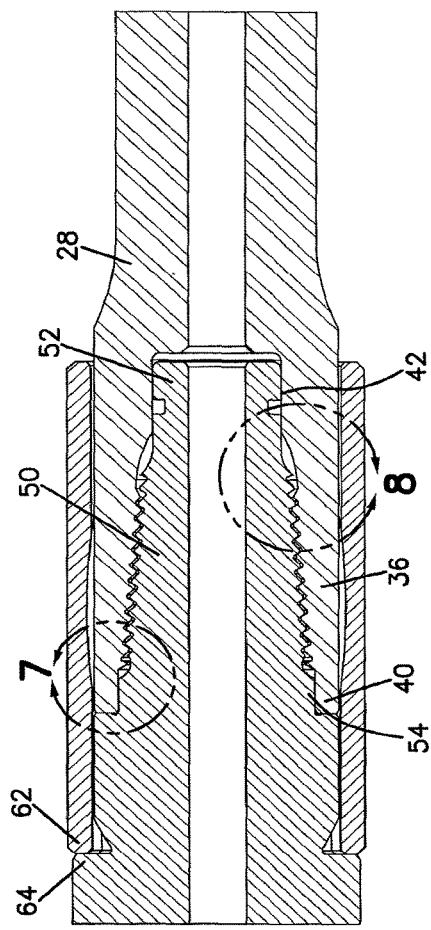
FIG. 5
FIG. 6

US 10,227,832 B2

TAPERED THREAD CONFIGURATION WITH IMPROVED DURABILITY

CROSS REFERENCE TO RELATED APPLICATIONS

This application is a continuation of U.S. application Ser. No. 14/663,208, filed Mar. 19, 2015, now U.S. Pat. No. 9,605,491, which is a continuation of U.S. application Ser. No. 13/380,168 filed on Jun. 26, 2012, now U.S. Pat. No. 8,991,490, which is a National Stage Application of PCT/US2011/062356 filed on Nov. 29, 2011, which claims priority to U.S. Provisional Patent Application Ser. No. 61/435,689, filed Jan. 24, 2011, and U.S. Provisional Patent Application Ser. No. 61/418,783, filed Dec. 1, 2010, which applications are incorporated herein by reference in their entirety.

TECHNICAL FIELD

The present disclosure provides a coupling for connecting a drill tool to a drill string and related methods.

BACKGROUND

Underground drilling operation often requires connecting a drill tool (e.g., drill bit, backreamer, etc.) to a drill string. It is desirable to connect the drill tools to a drill string in a manner that facilitates quick and easy assembly and disassembly.

Low torque coupling, commonly referred to as "torqueless" connection, can provide such functionality. The useful life and strength of such connections can be improved upon. The present disclosure provides a low torque coupling with improved strength and durability.

BRIEF DESCRIPTION OF THE FIGURES

FIG. 2 is a perspective view of a coupling according to the principles of the present disclosure;

FIG. 3 is a cross-sectional view of a portion of the coupling of FIG. 2;

FIG. 4 is a cross-sectional view of an alternative embodiment of the coupling shown in FIG. 3;

FIG. 5 is a side view of a portion of the coupling of FIG. 2 shown in a fully engaged position;

FIG. 6 is a cross-sectional view along line 6-6 of FIG. 5;

DETAILED DESCRIPTION

Figure 1:
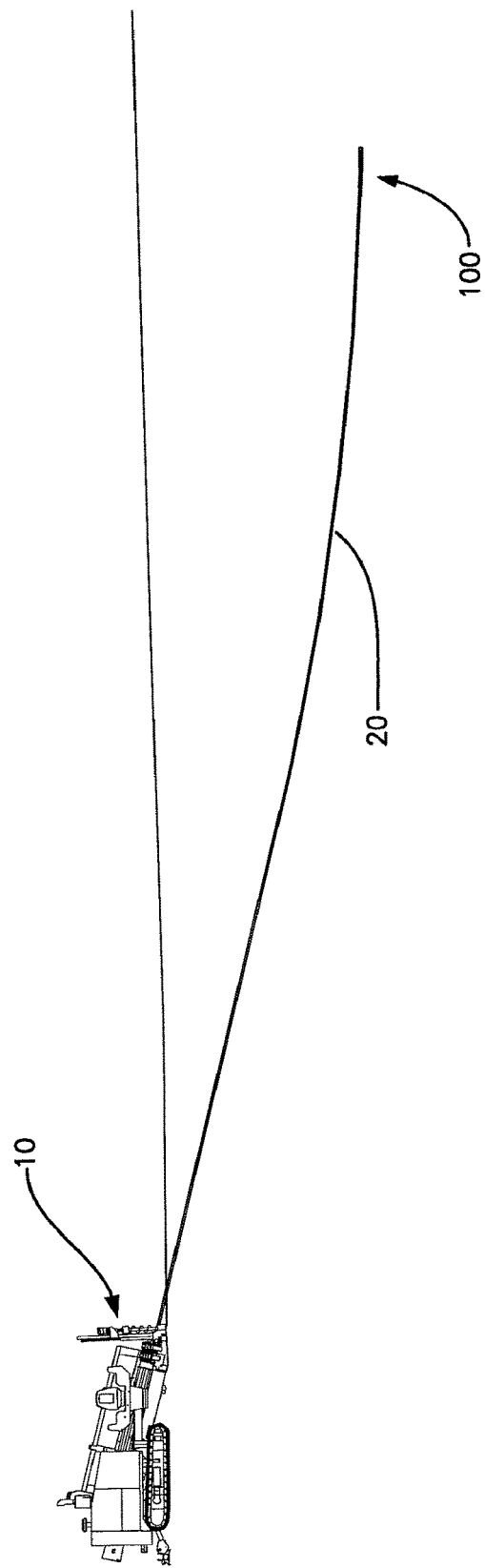
FIG. 1 is a schematic illustration of a drilling machine in operation.
Figure 7:
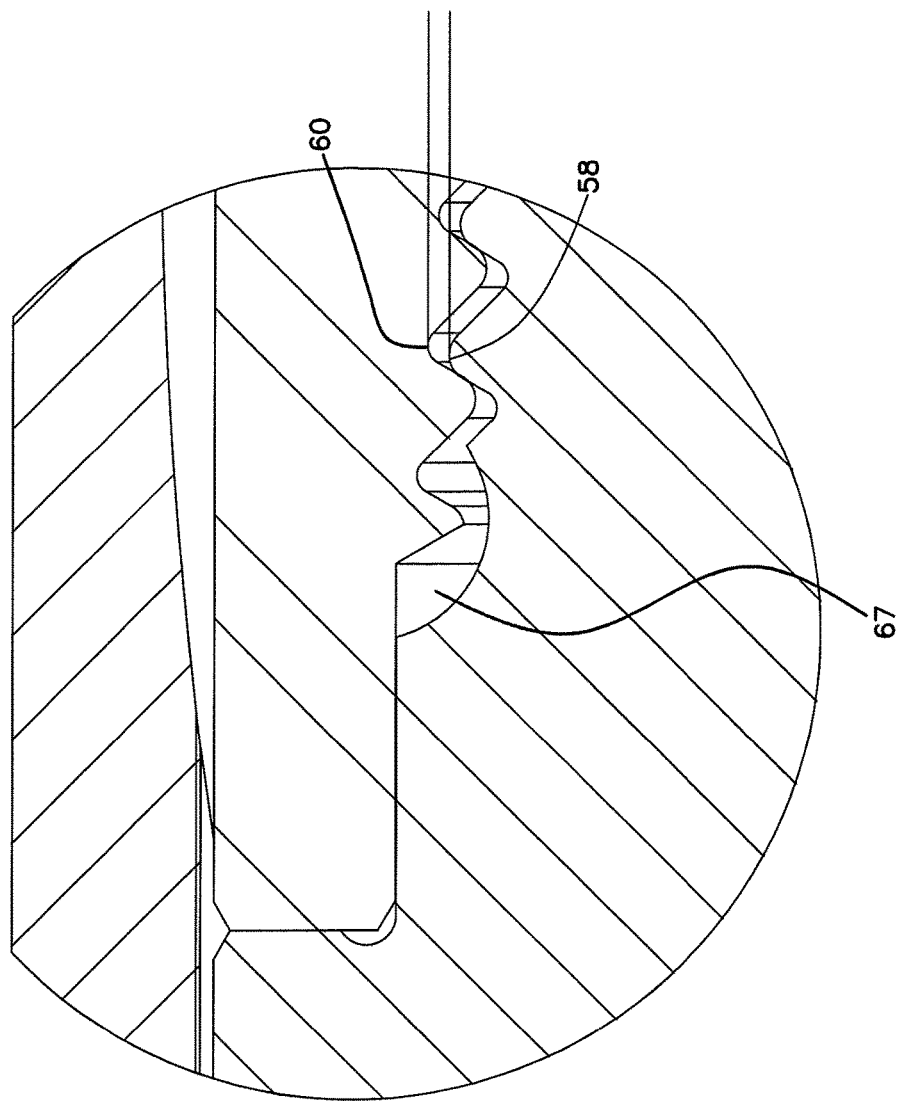
FIG. 7 is an enlarged view of a portion of FIG. 6 labeled 7.
Figure 8:
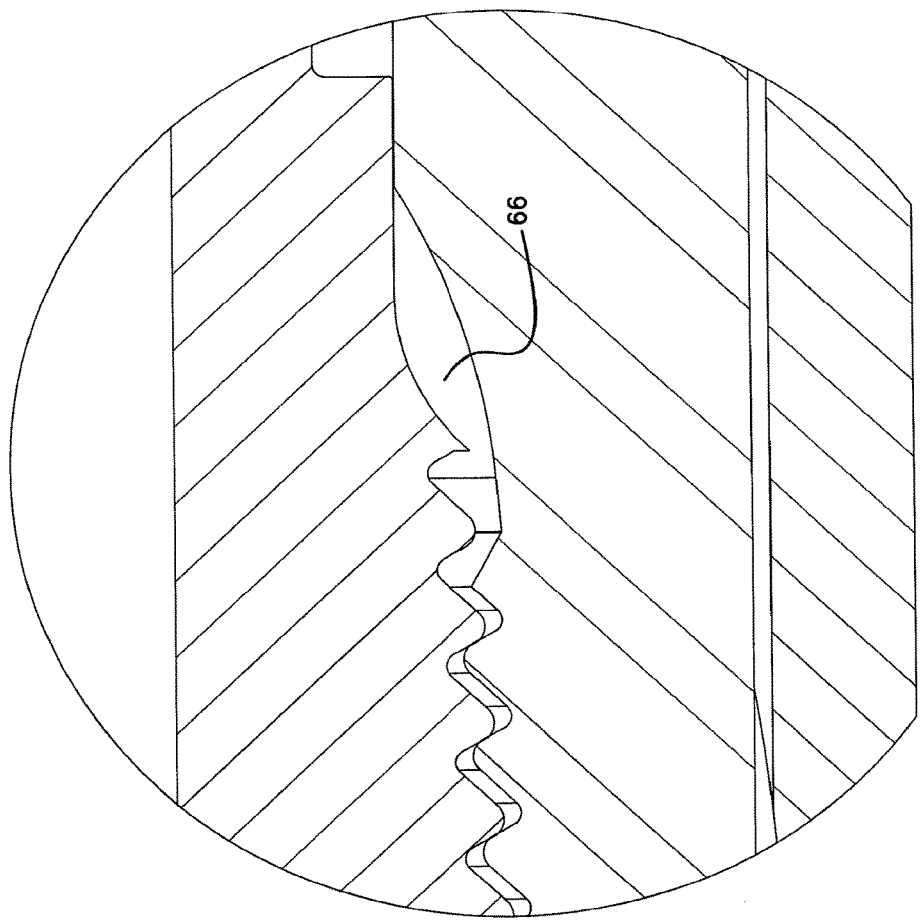
FIG. 8 is an enlarged view of a portion of FIG. 6 labeled 8.

Referring to FIG. 1, a drilling machine 10 is shown driving a drill string 20 into the ground. The distal end of the drill string includes a drill tool assembly 100. The coupling between an end of the drill string 20 and the drill tool assembly 100 is shown in greater detail in FIGS. 2-9.

Referring generally to FIGS. 2-9, a coupling between a starter rod 12 and a sonde housing 14 is shown. The starter rod 12, also referred to as a pilot rod or generically a first member, is thready connected to the distal most (down hole most) drill rod 16 via a torque connection. The sonde housing 14 is configured to house a sonde therein and supports a drill bit (not shown) at its distal end 24.

In the depicted embodiment an adaptor 18 is thready connected in the proximal end 22 of the sonde housing 14 via a torque connection. The adaptor 18 and sonde 14 are also referred to herein generically as a second member. A collar 26 is provided to slide over a distal end 28 of the starter rod 12 and a portion of the adaptor 18 to prevent relative rotation between the starter rod and adaptor (and hence also prevent relative rotation between the starter rod 12 and the sonde housing 14).

In the depicted embodiment an inner surface of the collar 26 is configured to engage external structural features on the distal end 28 of the starter rod 12 and on the exterior surface of the adaptor 18. In the depicted embodiment the collar includes internal flats 30 that engage flats 32 on the distal end 28 of the starter rod 12 and flats 68 on the exterior of the adaptor 18. The connection between the distal end 28 of the starter rod 12 and the proximal end 36 of the adapter 18 is described in greater detail below.

In the depicted embodiment the coupling includes first member including a driving end and a driven end. In the depicted embodiment, the first member is shown as the starter rod 12. The drive end is shown as the distal end 28 and the driven end is shown as the proximal end 34. The proximal end 34 is thready connected to the down hole most drill rod 16 via a torque connection.

In the depicted embodiment the driving end of a first member (e.g., the distal end 28 of the starter rod 12) includes a tapered portion (recess 36 shown in FIG. 3 or protrusion 38 shown in FIG. 4) including threads thereon. The driving end includes a first land 40 (FIG. 6) adjacent a distal end of the tapered portion (e.g., the protrusion 38 or recess 36) and a second land 42 (FIG. 6) adjacent a proximal end of the tapered portions (protrusion 38 or recess 36).

In the depicted embodiment the second member (adaptor 18) includes a drive end 44 and a driven end 46. The drive end 44 includes a threaded connection for attaching to a cutting tool (e.g., a sonde housing 14 supporting a drill bit). The driven end 46 is adapted for connection with the driving end 28 of the first member 12. The driven end 46 includes a tapered portion (e.g., recess 48 shown in FIG. 4 or protrusion 50 shown in FIG. 6) including threads thereon. The driven end 46 includes a third land portion 52 (FIG. 6) adjacent a distal end of the tapered portion (e.g., recess 48 or protrusion 50). The drive end 46 also includes a fourth land portion 54 adjacent a proximal end of the tapered portion.

In the depicted embodiment the first land 40 is configured to engage the fourth land 54 and the second land 42 is configured to engage the third land 52 when the tapered threads on the first member 28 are engaged with the tapered threads on the second member 18. In the depicted embodiment the clearance between the first land 40 and fourth land 54 and the clearance between the second land 42 and the third land 52 is sufficient to allow a user to slidably engage the first and second members by hand. In the depicted embodiment the first land and the fourth land are cylindrical having diameters that are at least 0.003 inches different from each other (for example, within 0.003 inches to 0.006 inches (0.076 to 0.150 millimeters) of each other). In other words, the clearance between the surfaces of the lands in a radial direction (radial clearance) is between 0.0015 to 0.003 inches (0.038 to 0.076 millimeters). It should be appreciated that in alternative embodiment the lands could be of different geometric configurations and have different clearance therebetween.

In some embodiment the peaks 58 of the threads on the tapered portion of second member and valleys 60 of the threads of the first member are offset by at least 0.030 inches (0.76 millimeters) even when the threads are engaged. In the depicted embodiment the pitch diameter between the threaded portions on the first and second members are offset by at least 0.030 inches. On a tapered thread like the ones shown the pitch diameter at a given position on the thread axis is the diameter of the pitch cone at that position. It should be appreciated that when the crest of the thread is truncated beyond the pitch line, the pitch diameter and pitch cylinder or pitch cone would be based on theoretical extension of the threaded flanks.

As discussed above, the second member is depicted as an adapter 18. However, it should be appreciated that in alternative embodiments the first member can be different components including, for example, a drill bit or a sonde housing.

Figure 9:
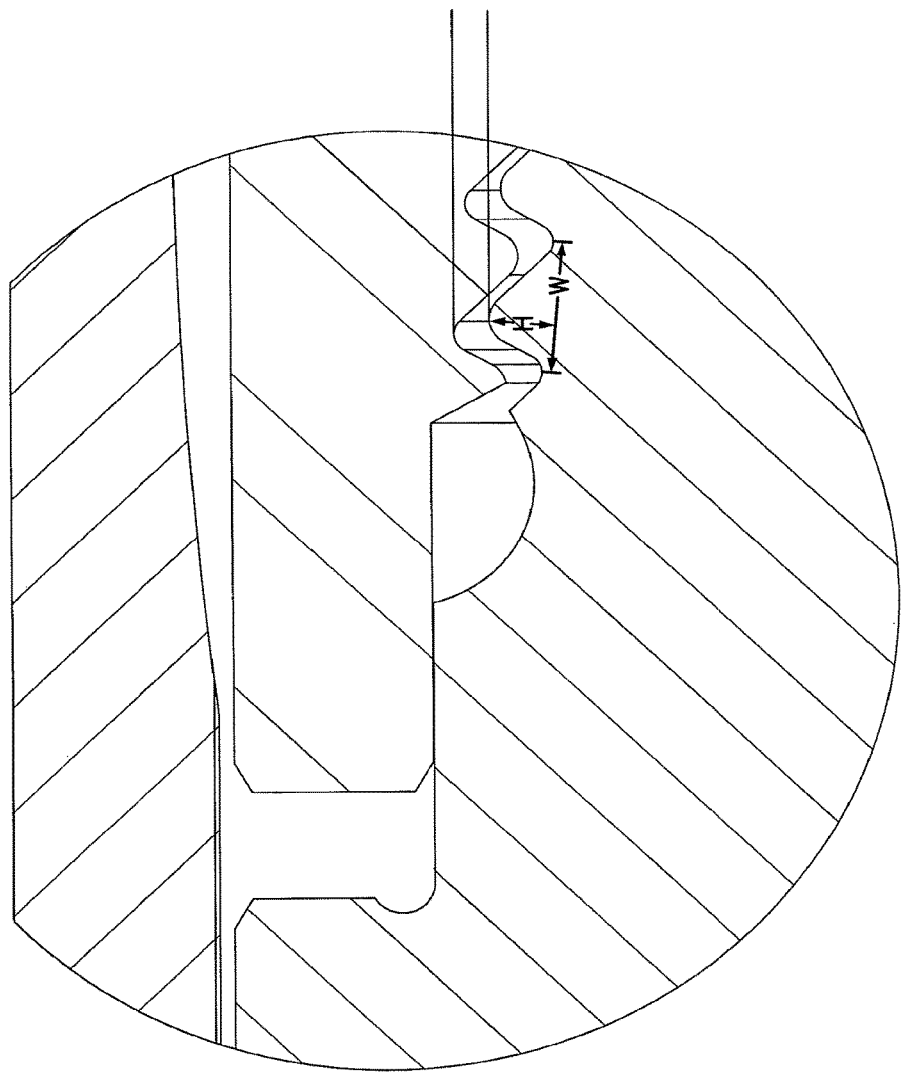
FIG. 9 is a view of the subject matter of FIG. 7 with the coupling shown in a partially engaged position.

In the depicted embodiment the threads on the tapered recess and threads of the tapered protrusions are asymmetric having a tooth width W to height H ratio between 1.25 to 3.0 (FIG. 9). The asymmetric short threads facilitate self-alignment and maintain the above-described offset between peaks and valleys of corresponding threads.

In the depicted embodiment the first member 28 includes structure that abuts structure on the second member 18 to limit the offset between the peaks of the threads on the tapered recess and valleys of the threads of the tapered protrusions. The structure on the first member is shown as front face 62 and the structure on the second member is shown as an annular shoulder 64.

In the depicted embodiment, a portion 66 (FIG. 8) of the tapered recess at its distal end is enlarged and does not include threads thereon. In the depicted embodiment, a portion of the tapered recess at its proximal end is also enlarged (portion 67 of FIG. 7) and does not include threads thereon. These portions are configured to receive foreign matter (e.g., rock and dirt) and thereby prevent the matter from jamming the connection between the first and second members. In addition, these portions also act as stress relief zones that distribute load at the transition, thereby avoiding stress concentrations, which increases the durability of the coupling 18. In the depicted embodiment the enlarged portion comprises an annular notch that is part of the tapered recess. It should be appreciated that in alternative embodiments the enlarged portion (e.g., notch) can be part of the tapered protrusion or both a part of the tapered recess and the tapered protrusion. It should also be appreciated that alternative embodiment may be configured without these enlarged portions.

In the depicted embodiment the proximal end of the coupling 18 (e.g., adaptor) which is shown threaded to the sonde housing 14 includes a tapered threaded portion configured to engage mating threads of a sonde housing to toque level in excess of 50 foot pounds. As discussed above, the distal end includes a tapered portion between a first unthreaded portion and a second unthreaded portion. The first and second unthreaded portions include a constant maximum cross-sectional dimension. As discussed above, the coupling includes a stop that engages an end face of the first member to prevent full engagement of the threads (i.e., maintains the above define offset). The stop is positioned on a predetermined location on the second unthreaded portion such that it ensures an offset of at least 0.030 inches between the peaks on the threads of the tapered threaded portion with the valleys on threads that the taper threaded portion is configured to engage. In the depicted embodiment the pitch diameter between the threaded portions on the first and second members are offset by at least 0.030 inches.

The present disclosure also provides a method of connecting a drill tool to a drill rod. The method includes the steps of: contacting threads located at a proximate end of a drill tool member with threads located at a distal end of a drill rod member; threading the drill tool member to the drill rod member by relatively rotating the drill rod member and the drill tool member; and aligning structural features on an external surface of the drill tool member with structural features on an external surface of the drill rod member. In the depicted embodiment the step of aligning the structural features includes counter rotating the drill rod assembly relative to the drill tool between one to ninety degrees.

The method further includes the step of sliding a collar over a portion of the drill tool member and drill rod member, wherein the collar is configured to engage the structural features on the external surface of the drill tool member and drill rod member thereby preventing relative rotation between the drill tool member and the drill string member.

In the depicted embodiment the step of threading the drill tool member to the drill rod member simultaneously inserts a boss on the distal end of the drill tool member with an aperture on the drill rod member and inserts a boss on the proximal end of the drill tool member with an aperture on a distal end of the drill rod member. The method also includes the step of maintaining at least 0.030 inch (0.76 millimeters) offset between a peak of the threads located on the proximate end of the drill tool member and a valley of the threads located at a distal end of the drill rod member at least when structural features on the external surface of the drill tool member are aligned with the structural features on the external surface of the drill rod member. In the depicted embodiment the pitch diameter between the threads on the drill tool and mating threads on the drill rod are offset by at least 0.030 inches.

In the depicted embodiment the threading step is accomplished by rotating the drill tool member while holding the drill rod member stationary. It should be appreciated that alternatively the drill rod could be rotated while the drill tool is held stationary. In the depicted embodiment, the threading step includes relatively rotating the drill rod member and drill tool member between one to four full revolutions. In alternative embodiments the threading step may include more or fewer revolutions.

In the depicted embodiment the toque needed to unthread the drill rod assembly from the drill tool assembly is less than 50 foot pounds. The step of threading the drill tool assembly to the drill rod assembly includes rotating the drill tool member until a portion of the drill tool member (e.g., annular shoulder) abuts a portion of the drill rod member (e.g., end face) and limits further rotation. In the depicted embodiment at least 0.030 inches offset is maintained when the portion of the drill tool assembly abuts the portion of the drill string assembly. The at least 0.030 inches offset is maintained even if as much as 50 foot pounds of torque are applied to the connection between the drill rod member and drill tool member during the threading step.

In the depicted embodiment the boss on the distal end of the drill tool includes a maximum cross-sectional dimension that is within 0.0015 to 0.03 inches (0.038-0.76 millimeters) of a maximum cross-sectional dimension of the aperture of the drill rod assembly.

Figure 10:
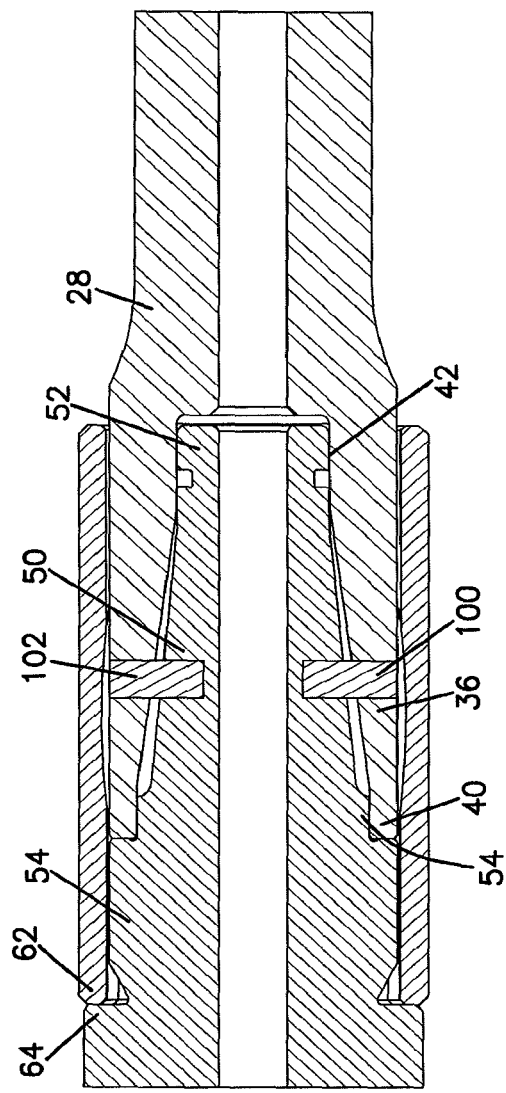
FIG. 10 is a cross-sectional view of an alternative embodiment of the coupling of FIG. 2.

Referring to FIG. 10, an alternative embodiment is shown. The depicted embodiment is similar to the above-described embodiment; however, the threads on the tapered protrusion and aperture are removed. Instead, pins 100, 102 secure the tapered protrusion within the tapered aperture and resist tension forces between the adapter 18 and the starter rod 12. The pins 100, 102 extend through a portion of the distal end 28 of the starter rod and driven end 46 of the adapter 18. The collar 26 slides over the end of the pins and retains them in place.

Figure 11:
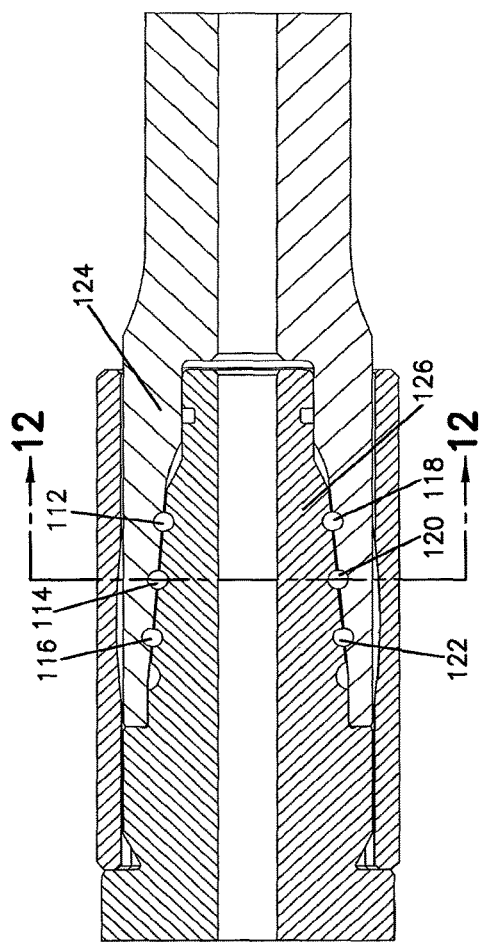
FIG. 11 is a cross-sectional view of an alternative embodiment of the coupling of FIG. 2.
Figure 12:
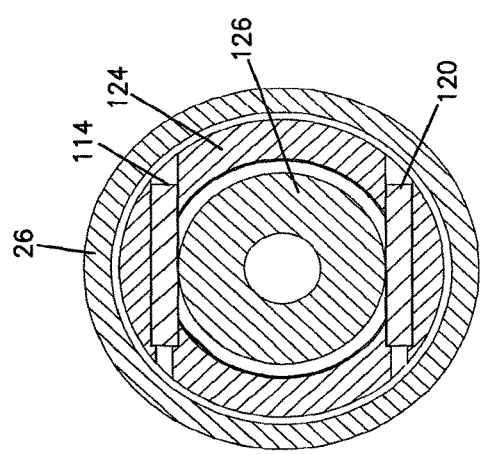
FIG. 12 is a cross-sectional view of the coupling of FIG. 11 along lines 12-12.
Figure 13:
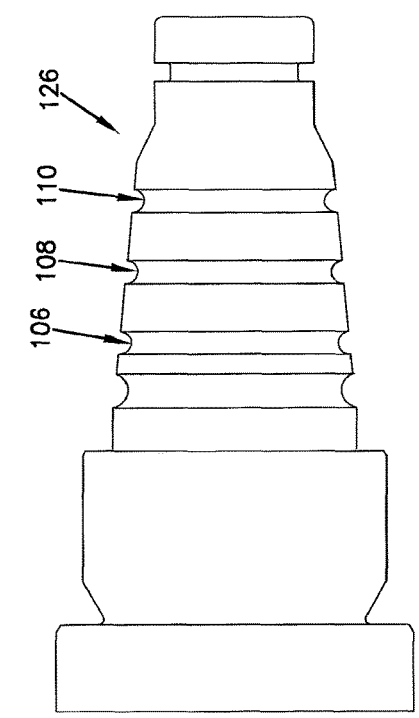
FIG. 13 is a side view of a portion of the coupling of FIG. 11.

Referring to FIGS. 11-13, another alternative embodiment is shown. In the depicted embodiment the tapered aperture 124 and protrusion 126 are not threaded. Instead, the tapered protrusion 126 includes grooves 106, 108, 110 that engage pins 112, 114, 116, 118, 120, 122, which are retain in pin receiving apertures that extend through a portion of the tapered aperture 124. The above described pin configuration secures the tapered aperture 124 to the protrusion 126 against tension forces applied to the connection during operation (e.g., as the drill string is pulled back through the hole). In the depicted embodiment the pins can be removed after removal of the collar 26 via driving a punch through smaller apertures that extend to the back side of the pin receiving apertures. It should be appreciated that although the tapered aperture and protrusion are shown with a gradual taper they could alternative have a stepped profile or the taper could be non-linear.

Figure 14:
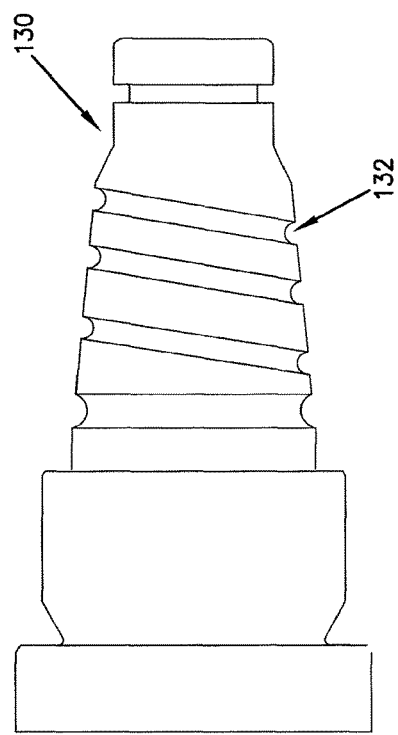
FIG. 14 is a side view of an alternative embodiment of the portion of the coupling shown in FIG. 13.

Referring to FIG. 14, another alternative embodiment is shown. In the depicted embodiment the tapered protrusion 130 includes a spiral groove 132 that is configured to mate with locking pins similar to those shown in FIGS. 11-13, which are retained in pin receiving apertures that extend through a portion of the tapered aperture 124 in a manner to intersect the spiral groove. In this embodiment the groove 131 acts as a single enlarged thread member that secures the tapered aperture and tapered protrusion together. This configuration provides a quick connection and disconnection between the tapered protrusion and tapered aperture. The locking pins that mate with the spiral grooves on the tapered aperture and the receiving apertures in the aperture 124 resist tension forces applied to the connection. The collar 26 prevents the tapered protrusion from rotating relative to the tapered aperture.

It should be appreciate that many more alternative embodiments are possible. For example, although the embodiment shown in FIGS. 10-14 are shown to include annular stress relief zone recess into the tapered protrusion similar to those described above with reference to FIGS. 7 and 8 (portions 66 and 67). Some alternative embodiment do not include stress relieve zones.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A threaded interface for use in connecting a removable down hole tool to a drill string, the threaded interface comprising:
    a threaded tapered section that extends between a first non-threaded portion and a second non-threaded portion, the first non-threaded portion being up hole from the second non-threaded portion, the threaded tapered section including threads thereon; and
    an annular stress relief notch providing a transition between the threaded tapered section and one of the first and second non-threaded portions, wherein first and second portions of the annular stress relief notch are circumferentially offset 180 degrees from one another about a longitudinal axis of the threaded interface, the first and second portions having the same notch profile and being positioned at the same axial position along the longitudinal axis.

2. The threaded interface of claim 1, wherein the annular stress relief notch has a width greater than the width of a thread on the threaded tapered section.

3. The threaded interface of claim 1, further comprising an exterior surface at a down hole end having a non-circular profile.

4. The threaded interface of claim 3, wherein a plurality of flats are provided at the exterior surface, the flats being configured to correspond with internal flats of a collar.

5. The threaded interface of claim 1, wherein threads on the threaded tapered section are asymmetric, and wherein a distance between adjacent valleys of the threads is 1.25 to 3 times greater than the height of a thread as defined by a radial distance between a peak and a valley of a thread.

6. The threaded interface of claim 1, wherein the first non-threaded section, the second non-threaded section, and the threaded tapered section are defined by an interior of a female connection structure.

7. The threaded interface of claim 6, wherein the female connection structure is provided at an end of a starter rod.

8. The threaded interface of claim 1, wherein the annular stress relief notch is provided between the threaded tapered section and the first non-threaded section.

9. The threaded interface of claim 1, wherein the first non-threaded section, the second non-threaded section, and the threaded tapered section are defined by a first male connection structure provided at a first end of an adapter body, wherein the adapter body has a second end defining a second male connection structure, wherein the second male connection structure defines a tapered threaded section having major and minor outer diameters that are respectively larger than corresponding major and minor outer diameters of the threaded tapered section of the first male connection structure, wherein the adapter body defines an intermediate region between the first and second male connection structures, and wherein a plurality of wrench flats are provided at the intermediate region.

10. The threaded interface of claim 1, wherein an up hole end portion includes the first non-threaded section, the second non-threaded section, the threaded tapered section, and the annular stress relief notch, and wherein a down hole end portion is configured to interface with a removable down hole tool assembly, the up hole end portion being opposed to the down hole end portion, and the up hole end portion being configured to interface with the drill string as part of a low torque coupling.

11. The threaded interface of claim 1, further comprising a body including the first non-threaded portion, the second non-threaded portion, and the tapered threaded portion between first and second non-threaded portion projections, wherein:
    the first non-threaded portion of the body is configured to slidably receive a first non-threaded portion projection of an adaptor and is configured to transfer at least bending forces between the body and the adaptor;

the tapered threaded portion of the body receives the adaptor and is configured to transfer at least tension forces between the body and the adaptor; and the second non-threaded portion of the body is configured to slidably receive a second non-threaded portion projection of an adaptor and is configured to transfer at least bending forces between the body and the adaptor.

12. A threaded interface for use in connecting a removable down hole tool to a drill string, the threaded interface comprising:

a threaded tapered section that extends between a first non-threaded portion and a second non-threaded portion, the first non-threaded portion being up hole from the second non-threaded portion, the threaded tapered section including threads thereon;

an annular stress relief notch providing a transition between the threaded tapered section and one of the first and second non-threaded portions, wherein first and second portions of the annular stress relief notch are circumferentially offset 180 degrees from one another about a longitudinal axis of the threaded interface, the first and second portions having the same notch profile and being positioned at the same axial position along the longitudinal axis; and an exterior surface at a down hole end having a non-circular profile, wherein the threaded interface is configured to form a low torque coupling with a mating component.

13. The threaded interface of claim 12, wherein the annular stress relief notch has a width greater than the width of a thread on the threaded tapered section.

14. The threaded interface of claim 12, wherein a plurality of flats are provided at the exterior surface, the flats being configured to correspond with internal flats of a collar.

15. The threaded interface of claim 12, wherein threads on the threaded tapered section are asymmetric, and wherein a distance between adjacent valleys of the threads is 1.25 to 3 times greater than the height of a thread as defined by a radial distance between a peak and a valley of a thread.

16. The threaded interface of claim 12, wherein the first non-threaded section, the second non-threaded section, and the threaded tapered section are defined by an interior of a female connection structure.

17. The threaded interface of claim 16, wherein the female connection structure is provided at an end of a starter rod.

18. The threaded interface of claim 12, wherein the annular stress relief notch is provided between the threaded tapered section and the first non-threaded section.

19. The threaded interface of claim 12, wherein the first non-threaded section, the second non-threaded section, and the threaded tapered section are defined by a first male connection structure provided at a first end of an adapter body, wherein the adapter body has a second end defining a second male connection structure, wherein the second male connection structure defines a tapered threaded section having major and minor outer diameters that are respectively larger than corresponding major and minor outer diameters of the threaded tapered section of the first male connection structure, wherein the adapter body defines an intermediate region between the first and second male connection structures, and wherein a plurality of wrench flats are provided at the intermediate region.

20. The threaded interface of claim 12, wherein an up hole end portion includes the first non-threaded section, the second non-threaded section, the threaded tapered section, and the annular stress relief notch, and wherein a down hole end portion is configured to interface with a removable down hole tool assembly, the up hole end portion being opposed to the down hole end portion, and the up hole end portion being configured to interface with the drill string as part of a low torque coupling.

21. The threaded interface of claim 12, further comprising a body including the first non-threaded portion, the second non-threaded portion, and the tapered threaded portion between first and second non-threaded portion projections, wherein:

the first non-threaded portion of the body is configured to slidably receive a first non-threaded portion projection of an adaptor and is configured to transfer at least bending forces between the body and the adaptor;

the tapered threaded portion of the body receives the adaptor and is configured to transfer at least tension forces between the body and the adaptor; and the second non-threaded portion of the body is configured to slidably receive a second non-threaded portion projection of an adaptor and is configured to transfer at least bending forces between the body and the adaptor.

* * * * *